A sample and hold auto-zeroing feedback circuit is utilized to drive the dark current of a solid state photodiode to zero in the absence of incident light photons. The just previously attained compensation is then held during a subsequent quantitative measurement cycle when the photodiode is illuminated. Plural linear and/or non-linear signal processing stages may also be included within the auto-zero compensation feedback loop such that their normal offset errors are also simultaneously compensated.

United States Patent [19]

Bax

[11] 4,341,956

[45] Jul. 27, 1982

[54] APPARATUS AND METHOD FOR COMPENSATING THE DARK CURRENT PHOTOELECTRIC TRANSDUCERS

[75] Inventor: Ronald F. Bax, Columbia, Md.

[73] Assignee: Pfizer, Inc., New York, N.Y.

[21] Appl. No.: 240,242

[22] Filed: Mar. 3, 1981

Related U.S. Application Data

[63] Continuation of Ser. No. 78,396, Sep. 24, 1979, abandoned.

[51] Int. Cl.³ .............................................. G01J 3/50
[52] U.S. Cl. ................................. 250/214 C; 307/311
[58] Field of Search ............... 250/214 C, 214 R, 562, 250/563, 369; 307/311

[56] References Cited

U.S. PATENT DOCUMENTS

| | | | |
|---|---|---|---|
| 3,600,584 | 8/1971 | Schneble | 250/369 |
| 3,600,589 | 8/1971 | Hanson | 250/214 R |
| 3,660,769 | 5/1972 | Jordan et al. | 328/127 |
| 3,683,187 | 8/1972 | Tompkins | 250/360 |
| 3,714,591 | 1/1973 | Allington | 328/162 |
| 3,715,588 | 2/1973 | Rose | 250/360 |
| 3,735,152 | 5/1973 | Oda | 307/555 |
| 3,764,922 | 10/1973 | Gilbert et al. | 328/162 |
| 3,772,604 | 11/1973 | Hogg et al. | 328/169 |
| 4,025,869 | 5/1977 | Smith | 328/162 |
| 4,036,763 | 7/1977 | Stephenson | 250/214 C |
| 4,061,925 | 12/1977 | van der Gaag et al. | 250/533 |
| 4,070,581 | 1/1978 | Gibbons et al. | 250/445 T |
| 4,080,074 | 3/1978 | French | 356/418 |
| 4,119,918 | 10/1978 | Moser | 328/165 |
| 4,220,860 | 9/1980 | Carlson et al. | 250/361 R |

Primary Examiner—David C. Nelms
Assistant Examiner—Darwin R. Hostetter
Attorney, Agent, or Firm—Cushman, Darby & Cushman

[57] ABSTRACT

34 Claims, 5 Drawing Figures

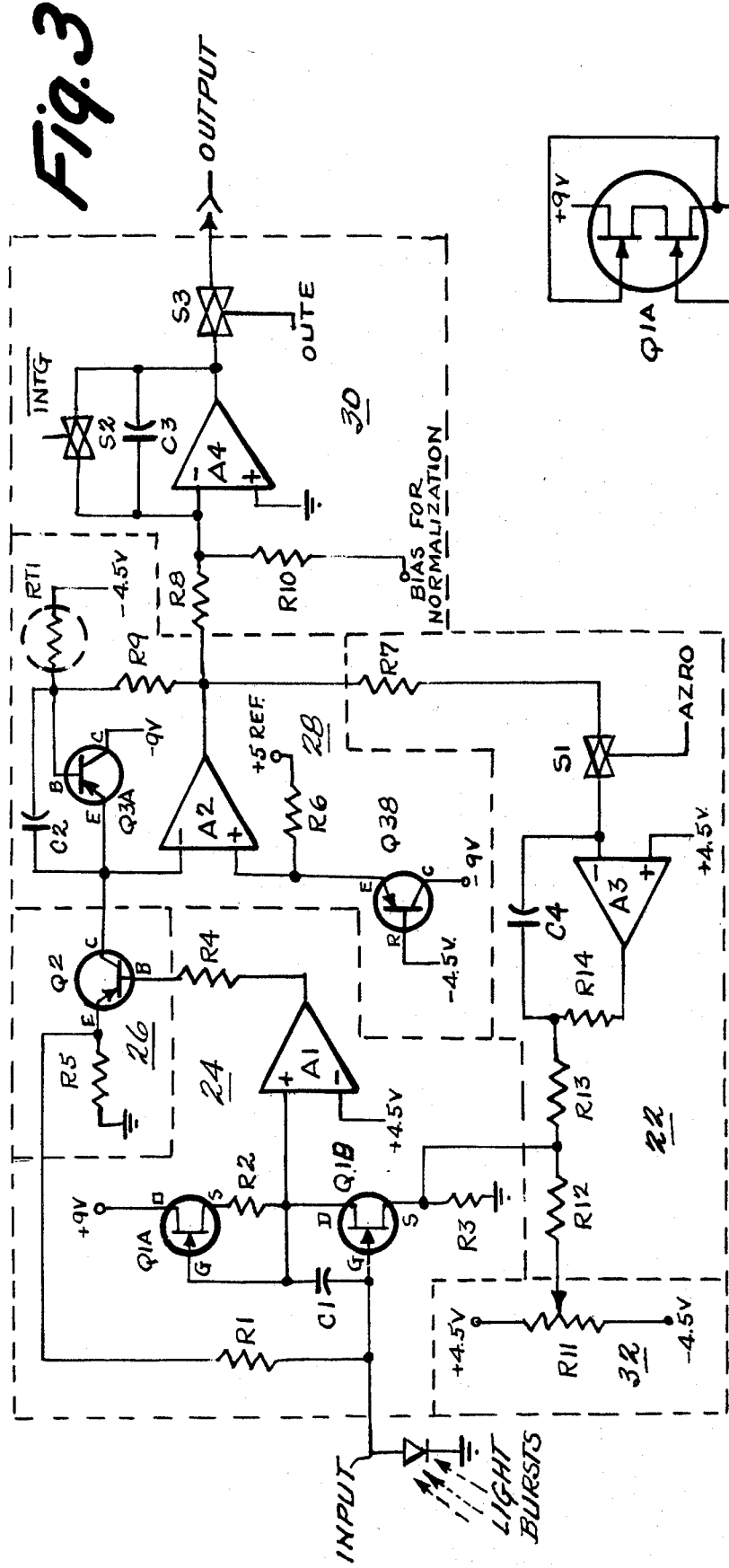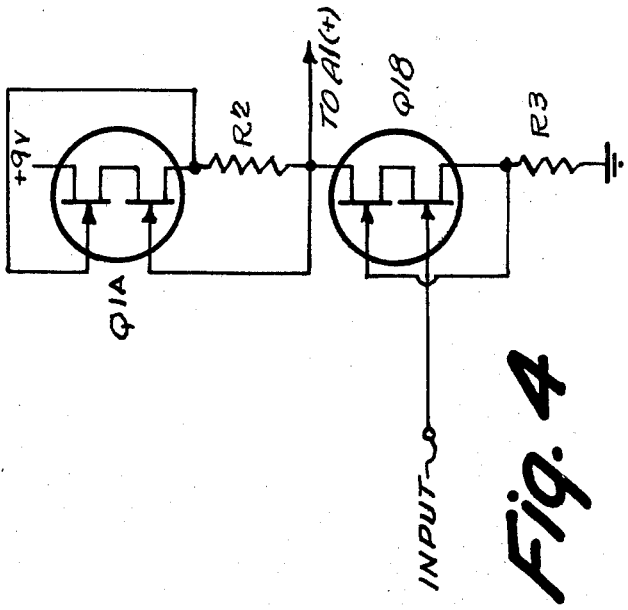

APPARATUS AND METHOD FOR COMPENSATING THE DARK CURRENT PHOTOELECTRIC TRANSDUCERS

This is a continuation of application Ser. No. 78,396 filed Sept. 24, 1979, abandoned.

This invention generally relates to the compensation of offset errors introduced into quantitative light photon measurements using normally available photoelectric transducers (e.g., silicon photodiodes) and imperfect amplifier circuits which introduce further offset errors. The invention is particularly useful in applications such as CT scanners where a photoelectric transducer is repetitively illuminated with successive bursts of light photons separated by intervening dark periods during which an auto-zeroing feedback loop can be activated.

It is well-known that photoelectric transducers such as silicon diodes have so-called "dark currents" which flow whenever a voltage is applied across the diode in spite of the fact that there are no incident light photons. If the dark current is only a small fraction of the expected signal current then it may sometimes be ignored. However, when the dark current becomes appreciable as compared to the signal level that is to be measured, then it must be taken into account.

At small values of impressed voltage (less than 10 millivolts) the leakage current of a silicon photodiode is simply the voltage E applied to the diode, divided by the resistance $R_{sh}$ of the diode itself. An attempt is usually made to maximize $R_{sh}$ by selection of silicon, and by using proper processing techniques during manufacture.

For a large area (60 mm$^2$) diode the value of $R_{sh}$ may be 1 to 100 megohms. A typical value is 10 megohms.

Such photodiodes are usually connected to analog amplifier circuits for typical applications. These amplifiers almost always have quiescent input offset voltages which cause photodiode dark currents to flow. Such offset errors are usually variable with respect to temperature or other parameters.

Typically, op-amps can be obtained having input offset voltages of approximately 1–10 millivolts, and can range to as low as tens of microvolts for premium chopper-stabilized or commutating auto-zero amplifiers. The price is high, however for the lower offset voltages. A low-cost (LF356) type of amplifier, or a discrete field effect monolithic pair, has an offset voltage approaching the neighborhood of 5 millivolts. Five millivolts offset divided by 10 megohms ($R_{sh}$) gives a dark current of 0.5 nanoamperes at 25° C. At 35° C. the dark current doubles to 1 nanoampere.

One typical prior art approach is to use a fixed offsetting d.c. signal to "buck" the unwanted dark current term. Another prior art approach is to "chop" the photodiode signal and to follow that with a.c. processing circuits thus losing the unwanted d.c. term which includes the dark current error. However, both of these prior art techniques suffer from serious practical disadvantages.

For example, the normal silicon photodiode dark current is a very sensitive function of temperature (e.g., 7% per degree C.) thus causing the offsetting or bucking d.c. signal to soon lose its effectiveness unless the temperature of the photodiode is very closely controlled or unless some attempt is made to track the offsetting d.c. signal with respect to temperature. If one were to simply buck out the dark currents at 25° C., and elevate the temperature by 10° C., another 0.5 nanoamperes of dark current would re-appear. In any event, when the dark current grossly exceeds the signal level to be measured, d.c. bucking techniques are usually unsatisfactory.

Furthermore, even where the dark current term is filtered out by a.c. processing, the processing circuits are required to have larger bandwidth than d.c. amplifiers which could otherwise be used and, of course, fairly elaborate synchronous as asynchronous demodulation circuits must be employed at some point in the process.

In C.T. scanner applications, maximum photodiode signal levels approach several hundred nanoamperes. When scanning large bodies, signal levels can be as low as several picoamperes. Given perfect initial removal of dark current, even a change of 0.1° C., during a scan, can cause a 50 picoamp shift in diode dark current, and an unacceptable non-linearity exceeding 1000%. The non-linearity causes effective compression gain in subsequent logarithmic amplifiers, and loss of intensity resolution when small signals are processed. It is thus imperative to remove as much of the dark current as possible.

Now, however, with this invention, a sample and hold automatic-zeroing compensation feedback loop is used to reduce the photodiode leakage or dark current by several orders of magnitude. Preferably substantially all the applied voltage is removed from the photodiode. Furthermore, one or more stages of linear and/or non-linear signal processing stages may be included within the loop to simultaneously compensate for their offset errors which may be somewhat similar to the photodiode dark current error. Such compensation is especially important where logarithmic processing is performed on the photodiode signal since even small dark current errors cause a rather large error in the resulting logarithmic measurement.

This invention eliminates substantially all of the unwanted leakage or dark current by forcing a silicon diode to operate at near zero applied potential. The automatic zeroing or nulling technique employed by this invention also eliminates many of the noise and bandwidth problems encountered with synchronous demodulation of a.c. "chop" signals.

In general, this invention takes advantage of the fact that offset errors such as associated with photodiode dark currents, related thermal effects, etc. are relatively slowly varying as compared to the period of rapidly succeeding measurement cycles such as often encountered in instruments such as CT scanners. In such environments, where thermal effects and other causes of offsetting errors are relatively slow (having time constants in the millisecond range), it has been found satisfactory to use an even slower, closed loop, sample and hold automatic nulling or zeroing compensation loop.

At predetermined times in the normal measurement cycle, incident light is removed from the photodiode. During this dark time period, the only output from the photodiode is the unwanted dark current term. Additionally, the offset errors introduced by other components in the signal processing circuit are also then isolated from any meaningful signal level. An overall auto-zeroing compensation loop then generates a compensating signal which reduces the error term to an insignificant level. When signal processing is again required (i.e., when incident light is again present at the photodiode), the compensation loop is temporarily opened but holds or "remembers" the just attained value of required compensating offset. Since the required degree of compensation should be approximately constant over the brief measurement cycle during which light is incident upon the photodiode, appropriate correction will be effected. As soon as the incident light is again removed from the photodiode, the auto-zeroing compensation loop is again enabled or closed so as to again re-zero in readiness for the next succeeding measurement cycle.

The memory employed for the auto-zero loop can be either analog or digital. For example, some analog memory devices are capacitors, motor-driven pontentiometers, or other analog devices as will be appreciated by those in the art. Digital memory devices are also well-known to those in the art and often take the form a digital register which drives a d/a converter. The actual memory device employed will vary depending upon the application, the required holding time, the required holding accuracy, the required acquisition speed for acquiring new data to be stored and/or the speed with which it is required to clear the memory device of previously stored data.

In certain photometric applications, and with respect to CT scanning applications in particular, the measured signals also pass through a logarithmic amplifier or log ratioing stage. For example, the logarithmic characteristic or transfer function of such an amplifier is used to linearize the exponentiated term involved in the measurement of X-ray absorption values. That is, in a CT scanner environment, the photodiode signal current is proportional to the incident light photons from a scintillator crystal which is, in turn, proportional to the incident X-ray flux. The incident flux is related to the flux output from a source multiplied by an exponential factor including the integration of the attenuation constants associated with the incremental volumes of materials through which the X-rays have passed on their way from an X-ray tube to a scintillator crystal. A log ratio operation is often used in a CT scanner environment to normalize for X-ray source intensity variations as will be appreciated. A log subtraction is performed using the detected signal and a reference version of the X-ray (or light) source. Such log subtraction is analogous to division or normalization techniques that are well-known in the art.

By including the logarithmic amplifier stage within the auto-zero compensation loop described above, a fixed percentage change in the input signal always produces a fixed output change, regardless of the absolute signal level. That is, at low signal levels, the total loop gain increases (because of the included logarithmic amplifier) thus causing this desired effect. The overall loop again in such situations is approximately equal to the inverse of the input signal level. Furthermore, variable (and/or fixed) offsets in the incoming photodiode signal (and in the input of the log amplifier itself), are much more significant at lower signal levels. If the log amplifier were not included in the auto-zero loop as just described, then these offsets would produce a much larger logarithmic conformity error in the output since the output of the logarithmic amplifier would be proportional to the logarithm of the desired signal plus the unwanted and uncompensated offset signals.

In particular, in CT scanning applications where large X-ray absorption or attenuation is encountered, the desired signal levels which must be accurately and quantitatively measured, maybe as little as 1% of the normally present dark current of a silicon photodiode. For example, a signal component might be only 1 millivolt while the dark current component would be on the order 100 millivolts. Under these conditions, the output of the uncompensated logarithmic amplifier can be in error by as much as 10,000%! However, when the logarithmic amplifier is included within the auto-zero loop of this invention, the larger the nominal expected error, the more information is available with which to correct the error! Accordingly, it has been discovered that it is possible to reduce errors of this kind by as much as four orders of magnitude using this invention.

These and other objects and advantages of the invention will be more completely understood by reading the following detailed description of the presently preferred exemplary embodiment of this invention in conjunction with the accompanying drawings, of which:

FIG. 3 is a detailed schematic diagram of the presently preferred exemplary embodiment of this invention as shown in FIGS. 1 and 2;

FIG. 4 is a detailed schematic diagram of an alternate embodiment for a portion of the circuitry shown in FIG. 3; and FIG. 5 is a signal timing diagram useful in explaining the operation of the circuitry shown in FIG. 3.

Figure 1:
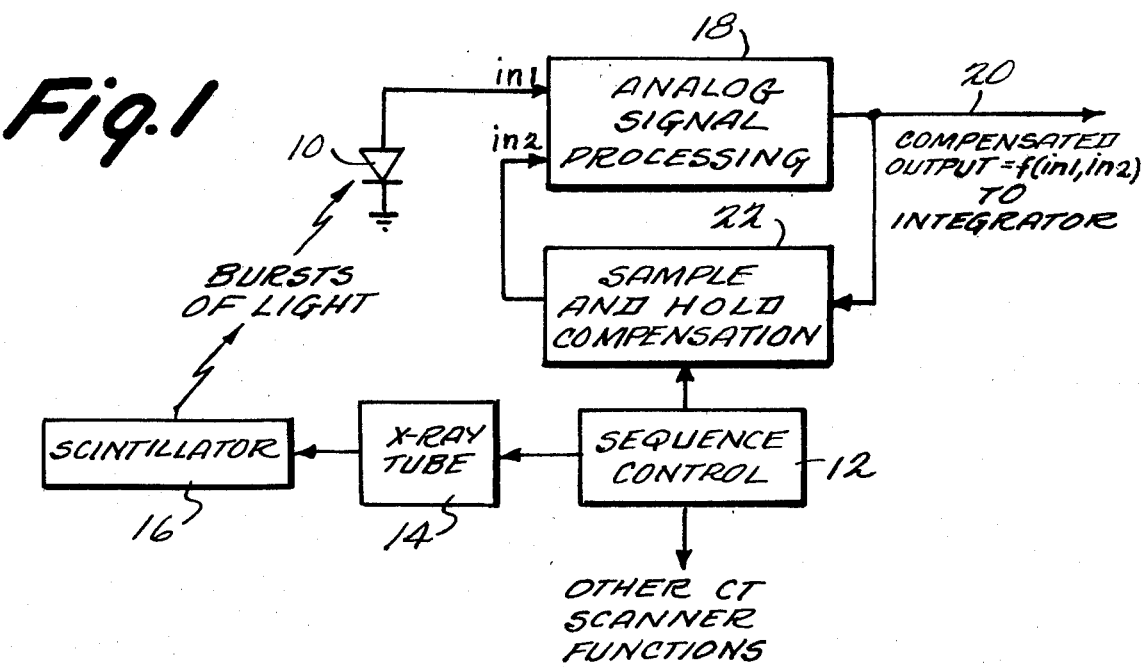
FIG. 1 is a block schematic diagram of the presently preferred embodiment of this invention.

Referring first to FIG. 1, a silicon photodiode 10 is shown as used in a CT scanner application. The usual CT scanner sequence control 12 pulses a source of X-ray flux 14 (e.g. an X-ray tube) in synchronism with mechanical movements of the CT scanner and/or causes the X-ray source 14 to rotate (mechanically or electrically) or otherwise move so as to sequentially activate various scintillator crystals 16 which are, in turn, in light communication with respectively corresponding photodiode PN junctions. As will be appreciated, the X-ray flux from source 14 will normally pass through various materials on its way to the scintillator including materials that are under X-ray measurement. Accordingly, in this application, it is usually desired to quantitatively measure the light photons incident upon the photodiode 10. Since the CT scanner sequence control 12, X-ray source 14, scintillator 16, etcetera are all of conventional design insofar as this invention is concerned, no further detailed description of these components should be required.

In accordance with this invention, analog signal processing circuits 18 are provided. The circuits accept two inputs, namely IN1 and IN2 and provide a compensated output at 20 which is a function of both the inputs. Typically, the output at 20 is applied to an integrator circuit and, from there, to analog-to-digital converter circuits all as will be appreciated.

During dark periods (i.e. when the sequence control 12 has turned the X-ray souce 14 "off"), the output signal on line 20 is connected in an auto-zero compensation feedback loop via the sample-and-hold compensation circuits 22 so as to supply the second input IN2 to the analog signal processing circuits 18. The first input IN1 comes directly from the photodiode 10.

During this dark period, the auto-zero compensation loop will drive the dark current of the photodiode 10 to zero. Thereafter, when the sequence control 12 turns the X-ray source 14 "on", the auto-zero feedback loop is disabled or opened. However, the sample-and-hold circuit 22 continues to "remember" the just attained level of compensation for IN2 and continues to maintain this same level of compensation throughout the next measurement cycle while the X-ray source 14 is "on". This cycle of operation is then again repeated whenever X-ray source 14 is turned off.

Figure 2:
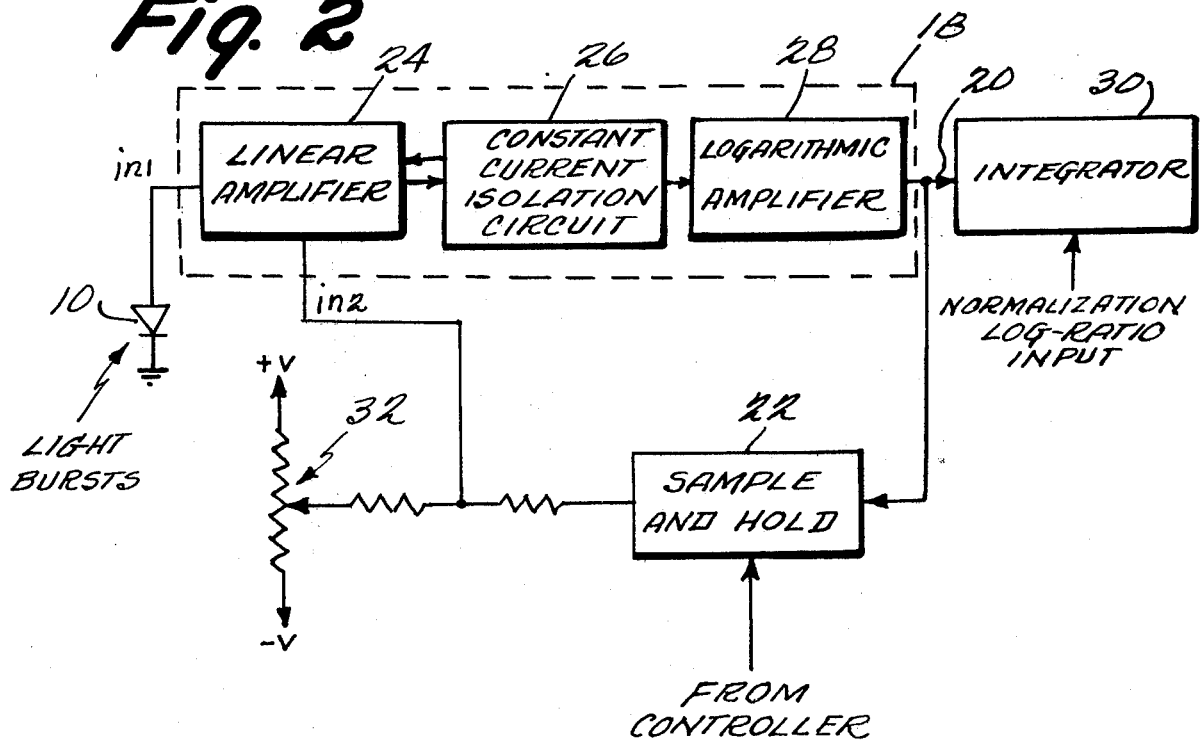
FIG. 2 is a more detailed block schematic diagram of the embodiment of FIG. 1.

The analog processing circuit of FIG. 1 is shown in slightly more detail at FIG. 2. As seen there, the analog signal processing circuit 18 comprises a linear amplifier stage 24, a constant current impedance isolation circuit 26 and a logarithmic amplifier 28. An integrator stage 30 is also shown as is a potentiometer 32 connected so as to provide a quiescent value of IN2 selected to approximately compensate the circuitry at some predetermined operating condition. Such a manually adjustable selection of the quiescent compensation signal level makes it possible to use auto-zero loop components having a smaller required range of operation.

The presently preferred exemplary embodiment of this invention as already described in FIGS. 1 and 2 is shown in a detailed schematic circuit diagram form at FIG. 3. In all FIGS. 1, 2 and 3, like reference numerals have been used to indicate corresponding elements.

Referring to FIG. 3, Q1A and Q1B comprise a "totem-pole" preamplifier stage. The discrete F.E.T. devices are chosen for low noise, and tightly matched D.C. characteristics. Assuming that both devices are operating at zero volts gate-to-source two perfect F.E.T.'s would conduct equally, and exactly one-half of +9 V, or +4.5 volts would be fed to the positive input of A1. This +4.5 volts is compared to the +4.5 volts at the negative or inverting input of A1 and the output of A1 provides base drive to Q2. Q2 will vary its emitter current until sufficient current flows through R5 to bias Q1B and create an equilibrium state. At equilibrium, the inputs of A1 will be such as to satisfy its input offset voltage requirements. The differential voltage at the inputs of A1 will typically be within a ±10 milli-volt band.

With the upper transistor, Q1A acting as a constant current load for Q1B, (a high impedance load approaching several megohms), the gain of Q1B is maximized, and is nominally several thousand (e.g. 2000). The overall open loop gain through Q1A, Q1B, A1, and Q2, is several million at D.C. (e.g. $4 \times 10^7$). The end result is that D.C. drift and noise due to A1 are negligible.

At equilibrium, the voltage which appears at the gate of Q1B, and thus across the photodiode, is simply the offset voltage of Q1B. This voltage can reside anywhere in the region of ±5 millivolts, and is the source of the photodiode dark current. Initially, R11 is adjusted to null out most of this offset. Typically the potentiometer is designed to provide a ±18 millivolt adjustment range. This reduces the requirements on amplifier A3 in the autozeroing operations to be described hereafter. Thus, R13 can be increased to a much larger value to decrease the droop effect due to C4 discharging in the hold mode.

With R13 equal to 300K, a shift of ±5 volts at the output of A3 will provide a nominal 1.6 millivolt shift at Q1B, to accommodate drift due to temperature, small supply changes, component aging, and shift in the output of R11 due to physical shock. In other words, it is only necessary to adjust R11 to the neighborhood of less than ±100 microvolts at the gate of Q1B. The auto-zero loop will take over from that point.

With the auto-zero loop operational, the only major source of bias to the photodiode is the gate-drain leakage of Q1B, times the parallel combination of R1, and $R_{sh}$ (of the diode). At 35° C., the diode bias may typically be approximately 100 microvolts and at 35° C., it would double to 200 microvolts. At 25° C., diode leakage current is thus typically 10 picoamperes. Instead of the original error band of ±0.5 nanoamperes or ±500 picoamperes, the reduction in error can be as much as 50/1 as shown.

A lower gate leakage F.E.T. or use of Q1A and Q1B in a cascode configuration can reduce leakage further, if required as shown in FIG. 4. There a dual-matched cascode F.E.T. is used for Q1A and Q1B. (e.g. National NQF 9406 or Intersil IT501.)

Once it is assumed that the input F.E.T. can be zeroed, there is the complication of voltage offset due to A2, the first log-amplifier stage. With another separate auto-zero loop or potentiometer, one could certainly zero A2, the logger. Either the preamplifier and logging must be done in one stage (it can be done) or in separate stages, where separate zeroing circuits are required. Use of one stage normally creates severe frequency compensation problems because of the large loop gain, and a large change in loop dynamics with signal change.

However it has now been discovered that one loop/potentiometer can be successfully used if the constant current stage Q2 also is provided. As stated before, the emitter current of Q2 is used as the feedback to the F.E.T. input stage. The collector current of Q2 is simply the alpha of Q2 times the emitter current and alpha can be virtually equal to one as will be appreciated. Thus, almost the full emitter current of Q2 flows in its collector. The collector current, however, is relatively independent of the collector voltage of Q2. As those familiar to the art will see, the circuit is a constant current source for the input of A2. In essence, the entire input stage is a current/current amplifier, with a gain equal to the ratio of R1 and R2 (e.g. 1000).

The presence of a current amplifier allows considerable simplification of the logger stage. A very accurate log ratio can be done with A2 and Q3, instead of the two or three amplifiers generally required for such performance. Also, since the logger stage is operating a high current (e.g. 100 micro amperes maximum, and 10 nanoamperes minimum) and the frequency compensation is simplified, it can be shown that the logger bandwidth can always be made greater than abut 16 KHZ. This is considerably larger than the 1.6 Hertz bandwidth which might be obtained at minimum signal without the current gain of the input stage.

Logging is done in Q3A, with Q3B acting as a compensating element. If it is assumed that Q3B is suplied with the +5 REF voltage by a matched regulator transistor having an identical $V_{BE}$ drop, the current through R6 is a reference current $I_{REF}$ (e.g. 100 A). The log characteristic of Q3A then may result in an incremental charge in VBE of about 59.12 m.v. per decade change in $I_B$ of Q3A. The logger output scale factor can then be shown to be nominally 1.5 v/decade (R9=24.3K and TR1=1K ohms).

The transfer equation of the logger is then:

$$E_o - 4.5v - K \log_{10} I_{in}/I_{REF} \quad \text{(Equation 1)}$$

or $$E_o - 4.5v + K \log_{10} I_{REF}/I_{in} \quad \text{(Equation 2)}$$

where $I_{in}$ = the current input to the logger.

Where IREF=100 μA and K=+1.5 v/decade, the overall equation for the preamp and logger may be shown to be:

$$E_o - 4.5v - 1.5 \log_{10} 1000 I_{in}/I_{REF} \quad \text{(Equation 3)}$$

or $$E_o = -4.5v + 1.5 \log_{10} I_{REF}/1000 I_{in} \quad \text{(Equation 4)}$$

where $I_{in}$=input current to the preamplifier.

Neglecting errors due to $V_{os}$ of A, the $V_{os}$ of Q3A and Q3B and small (but known) errors in the auto-zero loop:

$$E_o = -4.5v + 1.5 \, (\log_{10} I_{REF} - \log_{10} 1000 - \log_{10} I_{in}) \quad \text{(Equation 5)}$$

$$E_o = -4.5v + 1.5(\log_{10} I_{REF} - 3 - \log_{10} I_{in}) \quad \text{(Equation 6)}$$

If IREF and $I_{in}$ are both in μA, $E_o$ becomes the output from the logger A2 and the following transfer table can be realized:

TABLE I

| $I_{in}$ | $E_o$ |
|---|---|
| 100na | −4.5v |
| 10na | −3.0v |
| 1na | −1.5v |
| 100pa | 0V |
| 10pa | +1.5v |
| 1pa | +3.0v |
| .1pa | +4.5v |

Note that in the absence of any input signal or dark current $I_{in}=0$, ideally. However, the log of zero is negative infinity thus causing $E_o$ to attempt to go to positive infinity for $I_{in}=0$, but A2 would of course saturate at less than +9 v of output. In order for the circuit to function under these real world restraints, it is made to auto-zero with the output at a nominal +4.5 v with the equivalent of a 0.1 pico ampere input, or two decades below the minimum signal. This causes a known (and correctable) 1% log conformity error at minimum input which is easily compensated in postprocessing, either by analog or digital curve correction as will be appreciated.

When the auto-zero loop is closed by the AZRO control signal to S1 (see FIG. 5), integrator A3 is driven so as to cause equilibrium, where its negative input is equal to the positive input of +4.5 v (equivalent to 0.1 picoamperes input).

It can be shown that the approximately 20 pico amperes of F.E.T. gate leakage is also removed by the auto-zero loop. When the loop is closed, the only major error is the 0.1 pico ampere bias, i.e., zero input from the diode plus the gate leakage is made to equal 0.1 p.a. The photodiode sees the 100 to 200 μV mentioned previously.

To adjust the circuit, the auto zero loop is placed in the operative state (i.e. AZRO "on") with no illumination on the diode. The potentiometer R11 is adjusted for 0 volts ±0.1 volts at the output of A3 thus placing the auto zero integrator A3 in the center of its dynamic range.

Once the detector is in operation, the loop should accommodate drifts of up to ±1.6 millivolts at the source of Q1B. A temperature shift of ±20° C. from 25° C. ambient can be shown to result a nominal required shift of about ±0.5 V at A3. Thus, this circuit will comfortably accommodate a ±20° C. shift in temperature, when aligned at 25° C., if all other effects are considered to be second order, i.e. shifts in supply voltage, changes in the values of resistances and offsets in A1–A3 are of the order of 15 μV/°C. The actual anticipated temperature shift from ambient is expected to be half this value, or ±10° C.

Another important drift factor is due to discharge of C4 during the period when A3 is holding. If C4 is assumed to be charged to ±4.5 volts at the right ened, and −5 v at the left end, the total charge is 9.5 v. A good estimate for the internal resistance of C4 is 100,000 megohms, when mounted on a clean, conformally coated p.c. board thus making a potential leakage current of 95 pico amps. The input current of A4 at 35° C. is typically about 400 pico amps, as is the leakage current of S1. If all effects go in the same direction, the worst-case drift can be calculated as about 2.7 millivolts/second. This causes a shift at Q1B of about 0.9 microvolts/second (R3=100 ohms and R13=300,000 ohms). At 35° C., this results in an equivalent input drift of about 0.36 pico amps/second.

Since scan cycles in modern CT scanners are expected not to exceed 10 seconds, the total expected drift would be approximately 3.6 pico amps, or 36% of the minimum signal. Although the change is significant, it can be measured (known a-priori) for a given detector. It is in the form of a "weak" exponential added to a linear drift, and is small, and can, therefore, be minimized by appropriate computer processing of the output data using known techniques. Generally, it is expected that such drifts will add in r.m.s. fashion. Since there are many (e.g. 600) detectors in a scanner, the overall effect of the uncompensated r.m.s. drift is further decreased by the r.m.s. of many detectors.

S2 is the integrator reset, and S3, the output port. Their operation is conventional in the CT scanner art and, in fact, the output of A2 may be processed in another fashion if desired as will be appreciated. R10 is the point at which a logged reference detector signal is injected, to do log subtractive source intensity normalization as will be apparent to those familiar with CT scanners.

In operation, the output electrical signal from logger A2 is generated as a function of both the photodiode input and the compensation input from A3. In turn, the compensation signal is generated as a function of the photodiode input during the time when the photodiode is dark so as to then substantially compensate for erroneous dark currents. The required compensation signal is thereafter remembered or maintained by capacitor C4 at the just previously attained value when the photodiode is illuminated and switch S1 is opened so as to temporarily disable the auto-zero loop. This operation is repeated in synchronism with the periodic and repetitive light bursts incident upon the photodiode as in, for example, a CT scanner application. Preferably, the logger A2 is included within the auto-zero loop so as to automatically and simultaneously compensate for the offset errors of the logging stage as well.

While only one detailed exemplary embodiment has been described, those in the art will appreciate that many modifications and variations may be made in this embodiment without departing from the novel and advantageous features of the invention. Accordingly, all such modifications and variations are intended to be within the scope of the following appended claims.

What is claimed is:

1. Apparatus for reducing errors in photon measurements made with a photoelectric transducer having a variable offset component in its output electrical signal and which transducer is sometimes exposed to a source of photons, said apparatus comprising:
   a signal amplifier circuit including a non-linear amplifier and having an input connected to receive the electrical output signal of said photoelectric transducer, including said variable offset component and to provide a corresponding output, and
   a sample-and-hold feedback circuit connected to receive the output of said signal amplifier circuit and to sample same only during periods when said transducer is not exposed to said source of photons and to thereafter provide and maintain a respectively corresponding output feedback signal during periods when the transducer is exposed to the source of photons,
   said sample-and-hold feedback circuit having its output signal connected to control said signal amplifier circuit such that its output is compensated for said variable offset component.

2. Apparatus as in claim 1 wherein said signal amplifier comprises:
   a linear preamplifier stage having an input and an output, and
   an impedance isolation circuit connecting the output of the linear preamplifier stage to the input of the nonlinear amplifier stage.

3. Apparatus as in claim 1 or 2 wherein said sample-and-hold feedback circuit includes:
   a manually adjustable bias circuit connected to permit adjustment of the quiescent feedback signal to a value that approximately compensates said variable offset component at a predetermined operating condition of the photoelectric transducer.

4. Apparatus as in claim 2 wherein said linear preamplifier comprises:
   an operational amplifier having an input and an output,
   a pair of FETs (a) with one FET having a gate electrode connected to said photoelectric transducer, a source electrode connected to a degenerative feedback impedance and a drain electrode connected to the input of the operational amplifier and (b) with the other FET connected as a constant current load to the drain electrode of said one FET.

5. Apparatus as in claim 4 wherein each of said FETs comprise a dual-matched cascode FET.

6. Apparatus as in claim 2, 4 or 5 wherein said impedance isolation circuit comprises a transistor connected as a constant current source.

7. Apparatus as in claim 2, 4 or 5 wherein said nonlinear amplifier stage comprises a logarithmic amplifier.

8. Apparatus as in claim 4 or 5 wherein the output of said sample-and-hold feedback circuit is connected to said degenerative feedback impedance.

9. Apparatus as in claim 8 wherein said sample-and-hold feedback circuit includes:
   a manually adjustable bias circuit connected to permit adjustment of the quiescent feedback signal to a value that approximately compensates said variable offset component at a predetermined operating condition of the photoelectric transducer.

10. Apparatus as in claim 1, 2, 4 or 5 wherein said photoelectric transducer comprises a photodiode.

11. In a CT scanner having an X-ray source which is controlled to illuminate at least one scintillator in light communication with a photodiode, the improvement comprising:
    a first amplifier connected to amplify the electrical signal appearing across said photodiode and to provide a corresponding first output signal;
    impedance isolation means connected to receive said first output signal and to pass a corresponding second output signal,
    a second amplifier having a gain which increases for decreasing input signal level and connected to receive said second output signal voltage and to provide a corresponding third output signal, and
    a feedback circuit switchably connected to sample said third output signal when said X-ray source is turned off and to then feedback a compensating signal to said first amplifier until said third output signal is substantially compensated for relatively slowly varying errors therein,
    said feedback circuit being effectively disconnected from sampling said third output signal when said X-ray source is turned on but substantially maintaining the last just attained value of compensating signal whereby the third output signal nevertheless remains substantially compensated for said relatively slowly varying errors.

12. The improved CT scanner of claim 11 wherein said first amplifier is a linear amplifier.

13. The improved CT scanner of claim 11 wherein said second amplifier is a logarithmic amplifier.

14. The improved CT scanner of claim 11, 12 or 13 wherein said impedance isolation means comprises a transistor connected as a constant current source.

15. The improved CT scanner of claim 11, 12 or 13 further comprising:
    a manually adjustable bias circuit connected to adjust the quiescent compensating signal to a value that approximately compensates said third output signal at predetermined operating conditions.

16. The improved CT scanner of claim 11, 12 or 13 wherein said first amplifier comprises:
    an operational amplifier having an input and an output,
    a pair of FETs (a) with one FET having a gate electrode connected to said photoelectric transducer, a source electrode connected to a degenerative feedback impedance and a drain electrode connected to the input of the operational amplifier and (b) with the other FET connected as a constant current load to the drain electrode of said one FET.

17. The improved CT scanner of claim 16 wherein each of said FETs comprise a dual-matched cascode FET.

18. A quantitative light measuring apparatus comprising:
    a photodiode which provides a first electrical signal in response to incident light photons,
    an amplifier circuit including an amplifier having increasing gain for decreasing signal levels and connected to amplify said first electrical signal and to provide an output signal having at least one measurable electrical parameter which is quantitatively related to said incident light photons, and
    a sampling feedback circuit connected to sample said output signal at a time when there are substantially no incident light photons and to thereafter feedback a compensating signal to control said amplifier circuit so as to compensate said output signal for error components thereof which are substantially independent of incident light photons,
said feedback circuit maintaining said compensating signal substantially constant at its last just attained value when there are incident light photons.

19. A quantitative light measuring apparatus as in claim 18 wherein:
said amplifier circuit comprises two stages of amplification coupled by a constant current impedance isolation circuit.

20. A quantitative light measuring apparatus as in claim 19 wherein the last of said two stages of amplification comprises a nonlinear amplifier having a logarithmic-related transfer function.

21. A quantitative light measuring apparatus as in claim 18, 19 or 20 further comprising an integrator connected to receive and to periodically integrate said output signal when there are incident light photons.

22. Apparatus for quantitatively measuring bursts of incident light, said apparatus comprising:
a photoelectric transducer means for providing a first electrical signal having a component quantitatively related to the amount of light incident thereon and at least one other error component not so related, said error component varying with time but being substantially constant during any given burst of incident light,
electrical signal processing means having a first input connected to receive said first electrical signal, a second input for receiving an offset compensation signal, and an output which provides an output signal as a non-linear function of the signals received at both its inputs, and
sample-and-hold feedback means connected to receive said output signal between bursts of incident light, to generate said offset compensation signal so as to substantially compensate the output signal for any then present erroneous components therein, and to thereafter substantially maintain said offset compensation signal at this value during the next burst of incident light.

23. Apparatus as in claim 22 wherein said electrical signal processing means comprises:
a linear amplifier stage,
a nonlinear amplifier stage,
a constant current impedance isolation means coupling said linear amplifier stage and said nonlinear amplifier stage,
said linear amplifier stage having one input connected to said photodiode and a second degenerative feedback input connected to said feedback means.

24. Apparatus as in claim 22 further comprising:
a manually adjustable bias circuit connected to provide an adjustable quiescent level of said offset compensation signal.

25. Apparatus as in claim 23 wherein said linear amplifier stage comprises:
an operational amplifier having an input and an output,
a pair of FETs (a) with one FET having a gate electrode connected to said photoelectric transducer, a source electrode connected to a degenerative feedback impedance and a drain electrode connected to the input of the operational amplifier and (b) with the other FET connected as a constant current load to the drain electrode of said one FET.

26. Apparatus as in claim 25 wherein each of said FETs comprise a dual-matched cascode FET.

27. Apparatus as in claim 23, 25 or 26 wherein said constant current impedance isolation means comprises a transistor connected as a constant current source.

28. Apparatus as in claim 23, 25 or 26 wherein said nonlinear amplifier stage comprises an amplifier having a logarithmic-related transfer function.

29. A method of compensating for the temperature sensitive dark current component of the electrical signal of a photodiode, said method comprising steps of:
generating an output electrical signal as a non-linear function of both the photodiode electrical signal and at least one compensation signal,
generating said compensation signal as a function of said photodiode electrical signal during a time when the photodiode is dark so as to then substantially compensate for erroneous components thereof,
maintaining the just previously attained value of said compensation signal when the photodiode is illuminated, and periodically repeating the above steps in synchronism with illumination of said photodiode during successive time intervals.

30. A method as in claim 29 wherein the first-mentioned said generating step comprises linear amplification followed by nonlinear logarithmic amplification.

31. A method as in claim 29 or 30 further comprising the step of:
manually adjusting the quiescent value of said compensation signal so as to approximately compensate said output signal at predetermined operating conditions.

32. A method as in claim 29 or 30 performed as part of a CT scanning procedure.

33. A light measuring photodiode circuit imposing substantially zero applied voltage across the photodiode and thereby reducing the photodiode dark current to substantially zero, said circuit comprising:
a photodiode,
an amplifier circuit including a non-linear amplifier and having an input connected across said photodiode and having an offset input voltage drop at said input and thus appearing across said photodiode which can be controlled in magnitude to be substantially zero by a provided compensating input signal, said amplifier circuit also having an output providing a light measurement signal, and
a sample-and-hold integrator circuit connected to sample the light measurement signal when the photodiode is not illuminated and to provide said compensating input signal at a magnitude so as to cause said offset input voltage to be substantially zero,
said sample-and-hold integrator circuit thereafter substantially maintaining said compensating input signal at its last attained value when the photo diode is illuminated.

34. A light measuring photodiode circuit as in claim 33 wherein said amplifier circuit comprises a nonlinear amplifier having a logarithmic-related transfer function.

* * * * *